US010467873B2

(12) United States Patent
Chen et al.

(10) Patent No.: US 10,467,873 B2
(45) Date of Patent: Nov. 5, 2019

(54) PRIVACY-PRESERVING BEHAVIOR DETECTION

(71) Applicant: Intel Corporation, Santa Clara, CA (US)

(72) Inventors: Ke-Yu Chen, San Jose, CA (US); Shao-Wen Yang, San Jose, CA (US); Chieh-Yih Wan, Beaverton, OR (US); Rahul C. Shah, San Francisco, CA (US); Addicam V. Sanjay, Gilbert, AZ (US); Scott A. Thomas, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/712,438

(22) Filed: Sep. 22, 2017

(65) Prior Publication Data

US 2019/0096209 A1   Mar. 28, 2019

(51) Int. Cl.
| | |
|---|---|
| *G08B 13/24* | (2006.01) |
| *H04W 4/00* | (2018.01) |
| *H04W 4/02* | (2018.01) |
| *G06N 99/00* | (2019.01) |
| *H04W 4/80* | (2018.01) |
| *G06N 20/00* | (2019.01) |
| *G08B 13/196* | (2006.01) |

(52) U.S. Cl.
CPC ......... *G08B 13/2454* (2013.01); *G06N 20/00* (2019.01); *G08B 13/19604* (2013.01); *H04W 4/023* (2013.01); *H04W 4/80* (2018.02)

(58) Field of Classification Search
CPC .............. G08B 13/2454; G08B 13/248; G08B 13/2482; G08B 13/2462; H04W 4/80; H04W 4/023; H04W 4/027; G06K 7/10475; G06K 7/10366
USPC .................................. 340/10.1, 572.1, 572.4
See application file for complete search history.

(56) References Cited

U.S. PATENT DOCUMENTS 8,228,196 B1 *  7/2012  Thornton ........... G06Q 30/0268
                                              235/378
8,681,005 B2 *  3/2014  Austin .................... G01P 13/00
                                              340/552

(Continued)

OTHER PUBLICATIONS

"ShopMiner: Mining Customer Shopping Behavior in Physical Clothing Stores with COTS RFID Devices," Shangguan et al, SenSys '15, Nov. 1-4, 2015, Seoul, South Korea, pp. 113-126.

*Primary Examiner* — Adnan Aziz
(74) *Attorney, Agent, or Firm* — Alliance IP, LLC

(57) ABSTRACT

In one embodiment, an apparatus may comprise a sensor to detect a plurality of radio signals from one or more transmitters. The apparatus may further comprise a processor to: identify the plurality of radio signals detected by the sensor; detect a proximity of one or more assets based on the plurality of radio signals, wherein the one or more assets are associated with the one or more transmitters; identify the one or more assets based on an identity of the one or more transmitters, wherein each transmitter is associated with a particular asset; identify a plurality of signal characteristics associated with the plurality of radio signals; detect a proximity of a human based on the plurality of signal characteristics; and detect one or more human-asset interactions based on the plurality of signal characteristics.

23 Claims, 10 Drawing Sheets

(56) References Cited

U.S. PATENT DOCUMENTS

| | | | | |
|---|---|---|---|---|
| 8,938,256 B2* | 1/2015 | Logan | ............... | G08B 13/1427 340/988 |
| 9,171,442 B2* | 10/2015 | Clements | ............. | G08B 13/246 |
| 9,740,977 B1* | 8/2017 | Moon | ................... | G06Q 30/02 |
| 2006/0045310 A1* | 3/2006 | Tu | ...................... | G06K 9/00711 382/103 |
| 2007/0046439 A1* | 3/2007 | Takaku | ............... | G06K 7/0008 340/10.41 |
| 2008/0143532 A1* | 6/2008 | Murrah | .............. | G06K 19/0717 340/572.4 |
| 2009/0002165 A1* | 1/2009 | Tuttle | ....................... | G01S 3/48 340/572.1 |
| 2009/0027266 A1* | 1/2009 | Mohamadi | ........... | H01Q 1/2216 342/372 |
| 2009/0315678 A1* | 12/2009 | Padmanabhan | .......... | H04Q 9/00 340/10.1 |
| 2011/0193958 A1* | 8/2011 | Martin | ................... | H04N 7/181 348/143 |
| 2012/0062381 A1* | 3/2012 | Liu | ....................... | G01S 5/0252 340/572.1 |
| 2012/0319819 A1* | 12/2012 | Tkachenko | ........... | G01S 13/876 340/10.1 |
| 2012/0323807 A1* | 12/2012 | Sabeta | ................... | G06Q 30/02 705/317 |
| 2014/0167920 A1* | 6/2014 | Kamiya | .................. | G01S 13/58 340/10.1 |
| 2014/0363059 A1* | 12/2014 | Hurewitz | ........... | G06Q 30/0201 382/118 |
| 2015/0042795 A1* | 2/2015 | Tsuria | ....................... | A63F 1/00 348/143 |
| 2015/0145671 A1* | 5/2015 | Cohen | .................... | G08B 21/18 340/539.11 |
| 2015/0199890 A1* | 7/2015 | Hewett | ............. | G08B 13/2451 340/572.1 |
| 2016/0055360 A1* | 2/2016 | Haugarth | ........... | G06Q 30/0201 340/10.1 |
| 2016/0072907 A1* | 3/2016 | Papakipos | ............. | G06Q 10/10 709/217 |
| 2016/0086191 A1* | 3/2016 | Fonzi | ................... | G06Q 30/016 705/304 |
| 2016/0180404 A1* | 6/2016 | Stern | ................... | G06O 30/0269 705/14.58 |
| 2016/0316317 A1* | 10/2016 | Mayiras | ................ | H04W 4/025 |
| 2017/0116446 A1* | 4/2017 | Sample | ............. | G06Q 30/0251 |
| 2017/0124827 A1* | 5/2017 | Hardie-Bick | ........ | G08B 13/246 |
| 2017/0169681 A1* | 6/2017 | Markaryan | ........ | G06K 7/10475 |
| 2017/0200033 A1* | 7/2017 | Li | ...................... | G06K 7/10366 |
| 2017/0316665 A1* | 11/2017 | Sundholm | ............ | G08B 13/248 |
| 2018/0114106 A1* | 4/2018 | Pheil | ....................... | H04B 1/385 |
| 2018/0240180 A1* | 8/2018 | Glaser | ................ | G06K 9/00671 |
| 2018/0276692 A1* | 9/2018 | Sequeira | ........... | G06K 7/10366 |
| 2018/0300788 A1* | 10/2018 | Mattingly | .......... | G06Q 30/0625 |

* cited by examiner

PRIVACY-PRESERVING BEHAVIOR DETECTION

FIELD OF THE SPECIFICATION

This disclosure relates in general to the field of computing systems, and more particularly, though not exclusively, to behavior detection systems.

BACKGROUND

Advancements in modern computing have led to an increased use of vision-based computer technologies in a variety of mainstream computing applications. Privacy issues, however, often limit or preclude the use of computer vision technology in many privacy-sensitive contexts. While there are alternative technologies that may implicate fewer privacy concerns than computer vision technology, the existing alternatives are typically much less effective. Accordingly, in privacy-sensitive contexts, it may be difficult to leverage technological benefits that are comparable to those of computer vision technology, without compromising privacy and/or performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
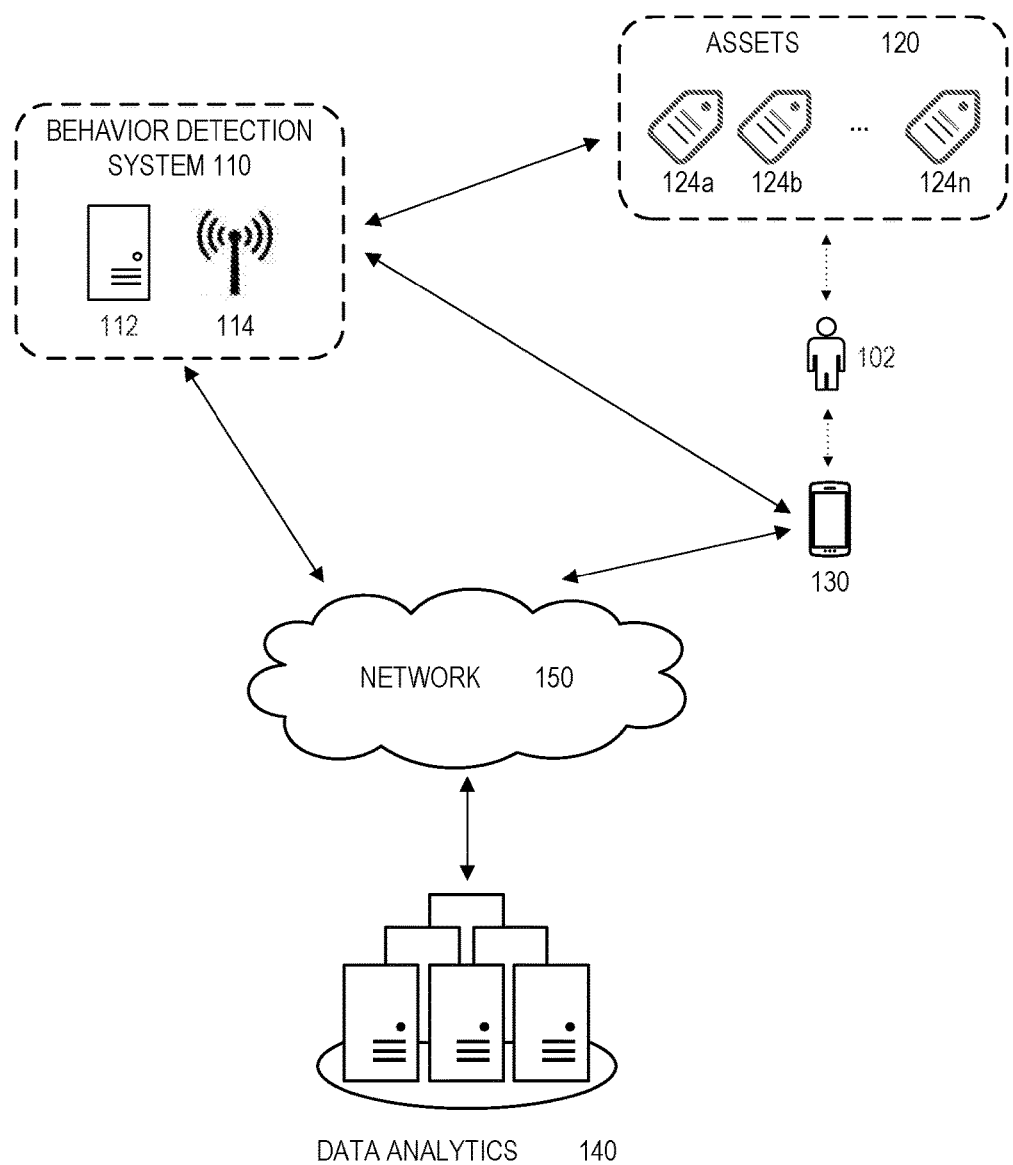
FIG. 1 illustrates an example embodiment of a behavior detection system in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Introduction

Advancements in modern computing, such as increasingly sophisticated computational capabilities and machine learning techniques, have led to an increased use of computer vision technology in a variety of mainstream computing applications. Privacy issues, however, continue to present a major obstacle limiting the potential scope and uses of computer vision technology. For example, computer vision solutions may be undesirable in privacy-sensitive contexts, such as retail fitting rooms, bathrooms, homes, and so forth.

With respect to the retail industry, for example, computer vision can be used to provide a variety of automated services in real-time, such as retail analytics or personalized customer services. For example, brick-and-mortar retailers often face unique disadvantages that may not apply to online retailers, such as the inability to observe and track customer behavior (e.g., to identify the products a customer is focusing on). These disadvantages can be alleviated, however, using various technologies to detect customer-product interactions in real-time, such as computer vision, indoor positioning (e.g., to locate customers within a store), and/or asset tracking (e.g., to track products/inventory), among other examples. For example, customers and products can be located in real-time using indoor positioning and asset tracking technologies, and based on the real-time locations of customers and products, customer-product interactions can be detected using computer vision technology. Accordingly, computer vision can serve an important role in detecting customer-product interactions with high precision and reliability. This use of computer vision, however, may be unsuitable and/or prohibited in certain privacy-sensitive contexts, such as retail fitting rooms where cameras are prohibited, among other examples.

Moreover, while existing solutions that do not leverage computer vision technology may provide better privacy (e.g., existing radio-based solutions), they are unable to accurately detect detailed customer behavior. For example, with respect to retail fitting rooms, existing radio-based solutions are unable to reliably detect customer behavior at a fine granularity, such as which items are tried on, the order in which items are tried on, combinations or groupings of items tried on together, the amount of time and/or number of times each item is tried on, and so forth. Moreover, in order to function properly while still only providing limited detection capabilities, existing radio-based systems may be dependent on densely deployed antennas (e.g., RFID readers), specific antenna placement locations and directions, and/or specific orientations of antennas/assets/humans that cannot always be guaranteed (e.g., a requirement that the human be standing between the antennas and assets/tags for proper detection). Existing solutions are therefore unable to detect human behavior in privacy-sensitive contexts (e.g., retail fitting rooms) in a reliable and finely-grained manner without compromising privacy.

Accordingly, this disclosure describes various embodiments of a privacy-preserving behavior detection system, which can be used to accurately detect human behavior in privacy-sensitive contexts, while preserving the requisite level of privacy. In some embodiments, for example, radio-frequency identification (RFID) technology can be used in a novel manner to accurately detect human-asset interactions. For example, RFID signals can be processed using novel signal processing and machine learning techniques to infer how a human is interacting with a particular asset or object. These novel techniques can accurately detect human-asset interactions without revealing any privacy-sensitive information. For example, the described embodiments provide accurate detection of human-asset interactions solely using RFID or other comparable technologies, and without relying on the sophisticated and privacy-intrusive technologies used by existing solutions (e.g., computer vision cameras and/or sensors), thus eliminating the privacy concerns associated with existing solutions.

In this manner, the described embodiments can be used to accurately track human-asset interactions without compromising privacy. While many of the example embodiments described throughout this disclosure focus on a use case for retail fitting rooms, the described embodiments can be applied to any privacy-sensitive contexts that involve interactions between humans and assets, such as homes (e.g., for home automation), bathrooms, locker rooms, childcare facilities (e.g., with smart/automated kid spaces), and so forth. The described embodiments are particularly advantageous for any use case involving strong privacy constraints, a confined space, a need to detect human-asset interactions, and/or detection capabilities that do not depend on human-carried devices such as smart phones (e.g., thus enabling detection regardless of whether a human is carrying a particular device).

The described embodiments provide numerous features and advantages, including the ability to accurately detect human behavior and interactions while preserving privacy. For example, human behavior and interactions can be detected without gathering any visual information, and the detected behavioral data can then be provided for further processing and analysis (e.g., at the network edge and/or remotely in the cloud) without including any personal identification information.

Moreover, the described embodiments can detect human behavior at a fine granularity, thus providing new insights into customer behavior in privacy-sensitive contexts, which existing solutions are unable to provide. For example, with respect to retail fitting rooms, the described embodiments can reliably detect customer-product interactions at a fine granularity, such as the items that are tried on, the order in which items are tried on, combinations or groupings of items tried on together, the amount of time and/or number of times each item is tried on, and so forth.

Moreover, the described embodiments do not require a dense deployment of antennas or readers, and their detection capabilities do not depend on any particular placement of antennas nor any particular orientation of the tracked assets relative to the antennas. The described embodiments also enable "device-free" detection of human behavior and interactions, meaning the detection capabilities do not depend on human-carried devices (e.g., smart phones), and thus are operable even when a human is not carrying a particular device. In the retail context, for example, customer behavior can be detected without requiring customers to carry a particular device and/or install certain software on their existing mobile devices. Moreover, the described embodiments can be implemented using a passive RFID-based approach, which avoids the need for an internal power source to be provided for the tracked assets, thus resulting in a smaller form factor and lower cost without sacrificing performance. In this manner, the described embodiments are particularly beneficial for deployment onto high-volume and low-cost assets (e.g., retail inventory).

Finally, the described embodiments also complement existing RFID-based tracking solutions (e.g., retail RFID tracking), as they can be seamlessly integrated with existing systems with minimal or no deployment of additional components and infrastructure (e.g., RFID tags and readers).

Example embodiments that may be used to implement the features and functionality of this disclosure will now be described with more particular reference to the attached FIGURES.

Privacy-Preserving Behavior Detection Embodiments

FIG. 1 illustrates an example embodiment of a system 100 for behavior detection in accordance with certain embodiments. In the illustrated embodiment, for example, system 100 includes a behavior detection system 110 that can detect interactions between a human 102 and one or more assets 120. In the illustrated embodiment, for example, each asset 120 includes an associated transmitter or "tag" 124, and behavior detection system 110 includes one or more antennas 114 that can detect signals associated with the tags 124 of the respective assets 120. Moreover, behavior detection system 110 also includes a processing device 112, which is used to process the signals received by antenna(s) 114 in order to detect human interactions with the assets 120 (e.g., using advanced signal processing and machine learning techniques). In some embodiments, for example, system 100 may be implemented using RFID-technology. For example, antennas 114 of behavior detection system 110 may be RFID readers, and tags 124 of assets 120 may be RFID tags. In this manner, behavior detection system 110 can use the RFID reader(s) to detect signals from the RFID tags of assets 120, and the RFID signals can then be processed to detect interactions between a human 102 and particular assets 120.

In some embodiments, for example, behavior detection system 110 may leverage advanced signal processing and machine learning techniques to detect interactions between a human 102 and one or more assets 120. For example, behavior detection system 110 may receive signals (via antenna(s) 114) from one or more tags 124 associated with assets 120, and may then analyze the signals to infer the behavior of a human 102 (or another "tag-free" high-dielectric object) that is in the proximity of assets 120. In some embodiments, for example, behavior detection system 110 may analyze certain characteristics of signals received from tags 124, such as signal phase, signal strength (e.g., based on a received signal strength indication (RSSI)), signal frequency information, Doppler shift information, and so forth. Based on the signal processing analysis, behavior detection system 110 may infer movements associated with a human 102 in the proximity of assets 120. For example, behavior detection system 110 may distinguish between no movement (e.g., assets 120 and their surroundings are stationary), human movement only (e.g., human 102 is moving but is not interacting with assets 120), and human and asset movement (e.g., human 102 is interacting with assets 120). Moreover, behavior detection system 110 may then use machine learning techniques to infer the interactions between human 102 and assets 120. In some embodiments, for example, machine learning may be used to infer human behavior by recognizing and learning behavior associated with different asset 120 motions. Moreover, in some embodiments, the detected human behavior may then be represented as a sequence of actions associated with assets 120, thus facilitating further data analytics based on the detected behavior.

In this manner, behavior detection system 110 can accurately detect human-asset interactions, but without gathering any intrusive or privacy-sensitive information associated with a person, such as visual representations of the person. Accordingly, behavior detection system 110 is suitable for performing sophisticated behavior detection in privacy-sensitive contexts, as the requisite level of privacy is preserved. In some embodiments, for example, behavior detection system 110 could be used to accurately track detailed customer-product interactions in a retail fitting room without compromising the privacy of a customer.

Moreover, in some embodiments, behavior detection system 110 may leverage user devices 130, such as a mobile device carried by human 102, to derive additional information about customer behavior. For example, behavior detection system 110 may detect the proximity of user devices 130 (e.g., via Wi-Fi or Bluetooth) to identify different instances of behavior associated with the same person. For example, in the retail context, the identity of a particular user device 130 (e.g., a smartphone) can be used to determine that certain behavior detected in a retail fitting room is associated with the same customer as a subsequent point-of-sale. Thus, while the detection capabilities of behavior detection system 110 do not require customers 102 to carry user devices 130, some embodiments may leverage the presence of user devices 130 to derive additional information about customer behavior.

Finally, in some embodiments, behavior detection system 110 may provide and/or transmit the behavioral data for further processing and analysis. For example, behavior detection system 110 may provide the behavioral data to a data analytics service 140, which may be implemented on-premise, at the network edge, and/or remotely in the cloud, and may perform further processing to derive additional insights into customer behavior. Moreover, any information associated with customer identity (e.g., a mobile device ID) can be filtered from the behavioral data prior to transmission to data analytics service 140. In this manner, detailed customer behavior information can be collected, processed on-premise or in the edge/fog, transmitted remotely to the cloud (e.g., over one or more networks 150), and/or thoroughly analyzed (e.g., to derive in-depth analytics and insights, provide automated/customized services, and so forth), without compromising customer privacy during any stage of the process.

The various components of system 100 are discussed further below. Moreover, example embodiments of privacy-preserving behavior detection are described further throughout this disclosure in connection with the remaining FIGURES. Accordingly, embodiments of system 100 from FIG. 1 may be implemented using any of the behavior detection functionality described throughout this disclosure.

Behavior detection system 110 may include any type or combination of hardware and/or logic used for detecting behavior and interactions associated with assets 120. In the illustrated embodiment, for example, behavior detection system 110 includes processing device 112 and one or more antennas 114. Processing device 112 may be used to process signals received by antenna(s) 114 in order to detect behavior associated with assets 120. Processing device 112 may be implemented using any type or combination of hardware and/or software logic, including semiconductor chips, accelerators, transistors, integrated circuits, application specific integrated circuits (ASIC), field programmable gate arrays (FPGA), processors (e.g., microprocessors), and/or any software logic, firmware, instructions, or code. Antenna(s) 114 may be used to detect, receive, and/or send wireless signals. In some embodiments, for example, antenna(s) 114 may be used to detect and/or receive signals associated with tags 124 of assets 120, and/or communicate with other devices or networks (e.g., user devices 130, data analytics services 140, network 150), among other examples. Antenna(s) 114 may be implemented using any type or combination of wireless technologies, including RFID, near-field communication (NFC), Bluetooth, ZigBee, Wi-Fi, cellular, and so forth. In some embodiments, for example, antenna(s) 114 may include one or more RFID readers to detect and/or receive signals associated with RFID tags 124 of assets 120. As another example, antenna(s) 114 may include Wi-Fi, cellular, Bluetooth, ZigBee, and/or NFC antennas to communicate with other devices or networks (e.g., user devices 130, data analytics services 140, network 150, and so forth). Moreover, in some embodiments, behavior detection system 110 may include a network interface for communicating remotely over one or more networks 150 (e.g., to communicate with data analytics service 140).

Assets 120 may include any type of article monitored by behavior detection system 110, such as retail merchandise and inventory (e.g., clothing, apparel, electronics, food and beverage), supplies (e.g., bathroom supplies, office supplies), equipment (e.g., vehicles, electronics, toys), living organisms (e.g., humans, animals, plants), and so forth. In the illustrated embodiment, each asset 120 includes a tag 124 that can be detected by antenna(s) 114 of behavior detection system 110.

Tags 124a-n may include any type or combination of components capable of communicating with or being detected by antenna(s) 114 of behavior detection system 110, such as an antenna, transmitter, receiver, signal processor, integrated circuit, microprocessor, and so forth. In various embodiments, tags 124 may be implemented using any type or combination of wireless technologies, including RFID, near-field communication (NFC), Bluetooth, ZigBee, Wi-Fi, cellular, and so forth. In some embodiments, for example, tags 124 may include RFID tags that can be detected by an RFID reader, such as an RFID antenna 114 of behavior detection system 110.

Human 102 may include any person in the proximity of assets 120 whose behavior and interactions with assets 120 can be detected by behavior detection system 110. In some embodiments, for example, human 102 may be a customer in a retail store interacting with retail merchandise (e.g., clothing and apparel). In other embodiments, however, behavior detection system 110 may be used to detect behavior and interactions of living organisms and/or high-dielectric objects other than humans (e.g., animals).

User device 130 may include any device associated with or carried by a human 102, such as a mobile device (e.g., mobile phone, tablet), wearable device (e.g., smart watch, smart glasses, headset), laptop or desktop computer, and so forth.

Data analytics services 140 may include any services that utilize information provided by behavior detection system 110, such as business services that derive insights into customer behavior, automated or personalized customer services, and so forth. In various embodiments, however, data analytics services 140 may include any type of service, including but not limited to, computational services (e.g., data analytics, searching, diagnostics and fault management), security and/or monitoring services (e.g., surveillance, alarms, user authentication), payment processing, mapping and navigation, geolocation services, audio and video streaming, messaging, social networking, news, weather, network or infrastructure management, data and application hosting, and/or Internet-of-Things (IoT) services, among other examples.

In various embodiments, data analytics services 140 may be implemented directly by behavior detection system 110, implemented at the network edge, and/or implemented remotely in the cloud. By comparison, the "cloud" often refers to remotely hosted devices and services, while the "edge" often refers to nearby devices and services deployed at or near the edge of a communications network. In some cases, the edge may also be referred to as the fog, as edge processing can be used to extend functionality typically provided in the "cloud" to the edge of a network, thus creating a "fog" over the network edge. In some cases, the edge may be more suitable than the cloud, for example, for maintaining privacy while processing privacy-sensitive information, processing information in real-time, and so forth.

Network 150 may include any communication medium(s) used to facilitate communication by components of system 100. In some embodiments, for example, behavior detection system 110, data analytics services 140, and/or user devices 130 may communicate using network 150. Network 150 may include any type or combination of communication networks, including, for example, local area networks, wide area networks, public networks, the Internet, cellular networks, Wi-Fi networks, short-range networks (e.g., Bluetooth, ZigBee), near-field communication (NFC) technologies, and/or any other wired or wireless networks or communication mediums.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
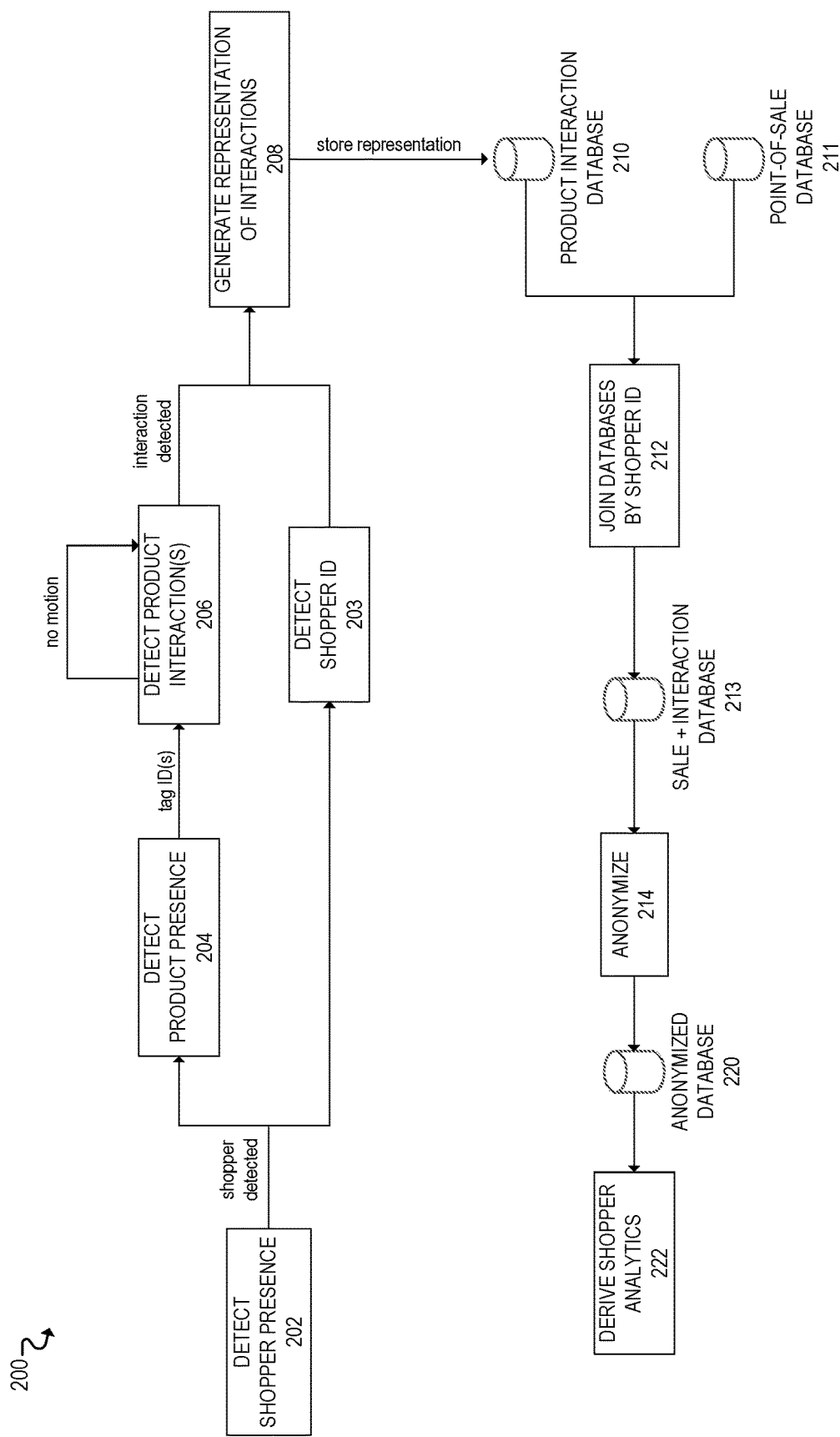
FIG. 2 illustrates example functionality of a behavior detection system for retail shoppers.

FIG. 2 illustrates example functionality 200 of a behavior detection system for retail shoppers. In some embodiments, the retail behavior detection functionality 200 of FIG. 2 may be implemented using the behavior detection system of FIG. 1.

In the illustrated embodiment, retail behavior detection functionality 200 is used to detect shopper-product interactions of retail shoppers. For example, retail behavior detection functionality 200 detects shopper-product interactions using RFID, without relying on privacy-intrusive technologies (e.g., vision-based cameras and/or sensors), thus eliminating the privacy concerns associated with existing solutions. In this manner, retail behavior detection functionality 200 can be used to accurately detect shopper-product interactions even in privacy-sensitive contexts, such as retail fitting rooms, without compromising shopper privacy.

The illustrated behavior detection functionality 200 assumes that each product in a retail store, such as clothing or apparel, has an attached RFID tag. In addition, behavior detection functionality 200 assumes that one or more RFID readers are deployed in the retail environment, such as in each fitting room. Given that many retail stores (e.g., clothing and apparel stores) already leverage RFID technology to track inventory, in some cases behavior detection functionality 200 may require minimal or no deployment of additional RFID infrastructure, such as additional RFID tags and/or readers.

As described further below, behavior detection functionality 200 uses RFID tag readings from the RFID reader(s) as input, and provides detected shopper-product interactions as output, optionally with other related information (e.g., corresponding sales information).

The behavior detection functionality 200 begins at block 202 by detecting the presence of a shopper in a retail fitting room. For example, in some embodiments, one or more RFID readers may be deployed in each fitting room (e.g., on the floor, wall, and/or door). In this manner, the RFID readers can detect the presence of RFID tags associated with retail products that are in the fitting room. Moreover, when an RFID reader detects the presence of one or more RFID tags, signal processing can be performed on the response from each RFID tag to determine whether a shopper is also present in the fitting room. In some embodiments, for example, shopper presence can be detected based on the signal characteristics of the response from each RFID tag, such as phase, signal strength, frequency information, Doppler shift information, and so forth.

For example, the signal characteristics of the response from each RFID tag can be used to distinguish between no movement (e.g., the retail product(s) and their surroundings are stationary), shopper movement only (e.g., a shopper is within the proximity of the product(s) but is not directly interacting with them), and shopper and product movement (e.g., the shopper is interacting with the product(s)). If no movement is detected, then it can be inferred that no shopper is present in the fitting room. However, if any movement is detected (e.g., shopper movement only, or shopper and product movement), then it can be inferred that a shopper is present in the fitting room.

Figure 3:
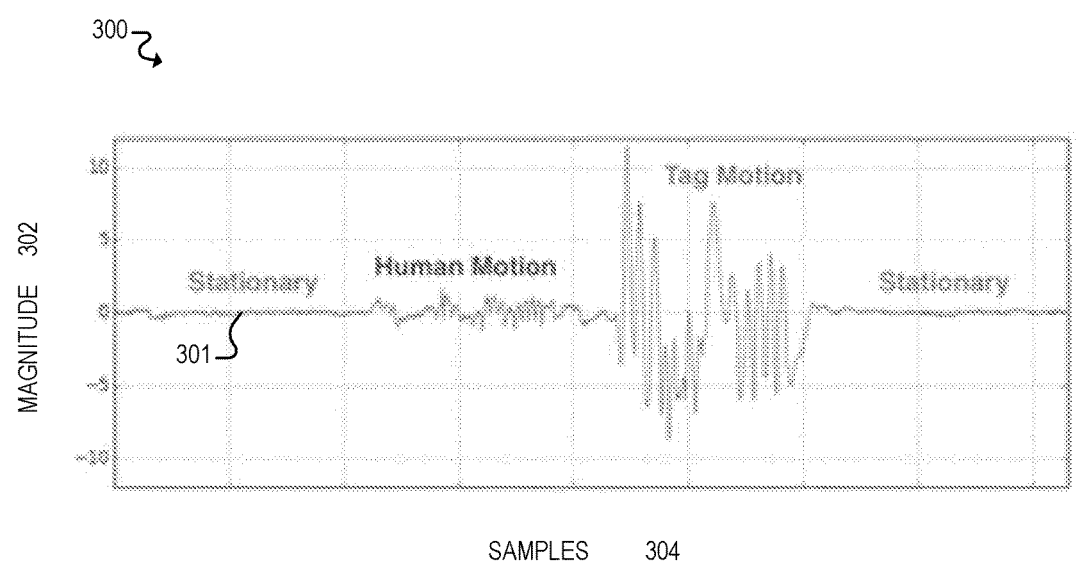
FIG. 3 illustrates an example of using RFID signal characteristics for behavior detection.

FIG. 3 illustrates an example of how the RFID signal characteristics can be used to distinguish between no movement, shopper movement only, and shopper and product movement. Accordingly, in some embodiments, behavior detection functionality 200 may detect shopper presence using the techniques illustrated and described in connection with FIG. 3.

Moreover, in some embodiments, behavior detection functionality 200 may use other techniques to detect shopper presence in fitting rooms, such as motion detectors, door sensors (e.g., to detect whether a door is closed and/or locked), and so forth.

Behavior detection functionality 200 may then proceed to block 203 to optionally identify the detected shopper. In some embodiments, for example, a shopper may be identified based on a mobile device detected within the proximity of the shopper (e.g., a smartphone detected using Wi-Fi or Bluetooth). In this manner, if a mobile device is detected within the proximity of the shopper, the identity of the mobile device can be treated as the shopper's identity. Accordingly, any behavior detected for the shopper (e.g., shopper-product interactions, actual sales) can be correlated with the associated mobile device identity, thus allowing different instances of behavior associated with the same shopper to be identified. For example, the identity of the mobile device can be used to determine that shopper-product interactions detected in the retail fitting room are associated with the same shopper as a subsequent point-of-sale.

This step is optional, however, and may not be performed in some embodiments (e.g., to provide increased privacy).

Behavior detection functionality 200 may then proceed to block 204 to detect the presence and/or identity of one or more products in the fitting room. For example, products can be detected and/or identified by detecting their associated RFID tags using an RFID reader in the fitting room. In some embodiments, for example, each RFID tag may emit a unique electronic product code (EPC), which may be used to identify the product associated with a particular RFID tag.

Moreover, in some embodiments, behavior detection functionality 200 may also identify "groups" of products brought in the fitting room together by the shopper. For example, the RFID tag signal characteristics (e.g., phase, signal strength, frequency, Doppler shift information) may be used to roughly position or localize the products associated with the respective RFID tags, and/or to detect correlated motion among products associated with certain RFID tags, among other examples. In this manner, groups of products brought in together can be identified based on the localization and/or correlated motion of the respective products.

Behavior detection functionality 200 may then proceed to block 206 to detect product motion and identify shopper-product interactions. In some embodiments, for example, product motion can be detected based on the RFID tag signal characteristics (e.g., phase, signal strength, frequency, Doppler shift information) as illustrated and described with respect to FIG. 3. Moreover, the particular shopper-product interactions can be identified using a machine learning model trained based on features extracted from RFID signal characteristics in both the time and frequency domains. In this manner, the machine learning model can be used to recognize and learn different shopper-product interactions associated with particular product movements. In some embodiments, for example, the machine learning model can be implemented using a supervised machine learning or deep learning technique, such as a decision tree, random forest, support vector machine (SVM), and/or neural network.

TABLE 1 illustrates an example classification of RFID signals using random forests to distinguish between stationary, interference, and motion classifications. For example, a "stationary" classification may imply that the retail product(s) and their surroundings are stationary (e.g., based on the detection of steady RFID signal characteristics and/or insignificant fluctuations). An "interference" classification may imply that a shopper is within the proximity of the product(s) but is not directly interacting with or moving the product(s) (e.g., based on the detection of RFID signal interference). A "motion" classification may imply that the product(s) are moving and thus the shopper is interacting with them (e.g., based on the detection of significant fluctuations in the RFID signal characteristics). As shown by TABLE 1, this example achieves solid performance with precision of 93.4%, recall of 92.9%, and an $F_1$ score of 93.1%.

TABLE 1

RFID-based motion detection

| | | Predicted | | |
|---|---|---|---|---|
| | | Stationary | Interference | Motion |
| Actual | Stationary | 16193 | 815 | 0 |
| | Interference | 378 | 4466 | 262 |
| | Motion | 0 | 412 | 3944 |

Behavior detection functionality 200 may then proceed to block 208 to generate a representation of the detected shopper-product interactions. In some embodiments, for example, the representation may include a timestamped tuple containing the following information: (1) shopper ID, if available (e.g., based on the identity of a detected mobile device); and (2) a sequence of timestamped products (e.g., based on the associated RFID tag IDs) to represent how the shopper interacted with the collection of products. The representation of the shopper-product interactions may then be stored in a shopper-product interaction database 210.

Behavior detection functionality 200 may then optionally proceed to block 212 to join the shopper-product interaction database 210 with a point-of-sale database 211 based on shopper ID. In this manner, the combined database 213 identifies the shopper-product interactions and actual product sales associated with each shopper (e.g., based on shopper ID). In some embodiments, for example, the combined database 213 may include the following columns: (1) shopper ID; (2) a sequence of timestamped products or associated RFID tag IDs (e.g., representing the shopper-product interactions); and (3) a list of products sold to the shopper (e.g., from the point-of-sale database 211).

Behavior detection functionality 200 may then optionally proceed to block 214 to anonymize the combined database 213. In some embodiments, for example, the combined database 213 may be anonymized for privacy preservation purposes before transmitting the associated shopper data to the edge or cloud (e.g., for further processing and analysis). For example, in some embodiments, an anonymized database 220 may be created by removing the shopper ID field of the combined database 213. In this manner, the anonymized database 220 may include the following columns: (1) a sequence of timestamped products or associated RFID tag IDs (e.g., representing the shopper-product interactions of a particular shopper); and (2) a list of products sold to the shopper.

Behavior detection functionality 200 may then proceed to block 222 to derive shopper analytics and insights. In some embodiments, for example, the anonymized database 220 may be processed on-premise (e.g., within the retail store premises) or in the edge/fog, and/or may be transmitted remotely to the cloud for further processing. In this manner, shopper analytics and insights may be derived based on the behavioral data contained in the anonymized database 220. Moreover, if a shopper ID is available, the analytics can be linked to a particular shopper, but otherwise they may be general and not linked to any particular shopper.

In some cases, for example, the behavioral data in the anonymized database 220 may be processed further to perform reasoning about the correlation between shopper-product interactions and corresponding actual sales. For example, assuming a shopper ID was detected by behavior detection functionality 200, the behavioral data will include corresponding actual sales associated with the shopper-product interactions for that shopper. Accordingly, the actual sales can serve as a ground truth label to train a supervised machine learning model used for data analytics. Otherwise, assuming no shopper ID was detected and thus the behavioral data does not include corresponding actual sales, valuable insights may still be derived from the shopper-product interactions. In some embodiments, for example, the shopper-product interactions may be used by a semi-supervised machine learning model.

Example analytics that could be derived include, but are not limited to, what products were tried on, the order in which products were tried on, combinations or groupings of products brought into the fitting room together and/or tried on together, the amount of time and/or number of times each product was tried on, and so forth. For example, the amount of time spent trying on a particular product could be derived based on the duration of any movement that was detected for that product.

In this manner, behavior detection functionality 200 can be used to derive in-depth customer analytics and insights based on customer behavior in privacy-sensitive contexts (e.g., retail fitting rooms), but without gathering any visual or otherwise intrusive information, and without transmitting any personal identification information (e.g., a mobile device ID associated with a customer) beyond the store premises.

FIG. 3 illustrates an example 300 of using RFID signal characteristics for behavior detection. In some embodiments, the approach illustrated in example 300 could be used by the behavior detection functionality 200 of FIG. 2 to detect the presence of shoppers and products, and identify shopper-product interactions, in a retail environment.

In particular, example 300 illustrates a graph of the phase magnitude 302 for various samples 304 of an RFID signal 301. Moreover, example 300 shows how the phase of the RFID signal can be used to distinguish between no movement, human movement, and RFID tag movement. A similar analysis can also be performed based on other signal characteristics, such as signal strength, frequency, Doppler shift information, and so forth.

As shown by example 300, if the phase of an RFID signal is relatively steady and/or reflects insignificant fluctuations only, it may be determined that the detected RFID tag and its surroundings are stationary, and thus no movement is occurring.

However, if the phase of the RFID signal reflects some fluctuations that are relatively small, it may be determined that a human is moving within the vicinity of the RFID tag, thus causing interference in the associated RFID signal. The relatively small fluctuations, however, suggest that the human is not directly interacting with or moving any product associated with the RFID tag. In some embodiments, human movement can be detected in this manner in order to identify the presence of a shopper in a retail environment, such as a fitting room. For example, the presence of a shopper could be detected using thresholding, by identifying fluctuations in the RFID signal characteristics that exceed a particular threshold. The presence of a shopper could also be detected using a pre-trained supervised machine learning model based on the magnitude of RFID signal characteristics, such as phase and/or signal strength.

Finally, if the phase of the RFID signal reflects relatively large fluctuations, it may be determined that the RFID tag itself is moving, which suggests that a human is interacting with the product associated with the RFID tag. Moreover, in some embodiments, detection of RFID tag movement could be used to identify the particular shopper-product interactions that occur in a retail environment, such as a fitting room. For example, the particular shopper-product interactions can be identified using a machine learning model trained based on features extracted from the RFID signal characteristics (e.g., phase, signal strength, frequency, Doppler shift information) in both the time and frequency domains. In this manner, the machine learning model can be used to recognize and learn different shopper-product interactions associated with particular product movements. In some embodiments, for example, the machine learning model can be implemented using a supervised machine learning or deep learning technique, such as a decision tree, random forest, support vector machine (SVM), and/or neural network.

Figure 4:
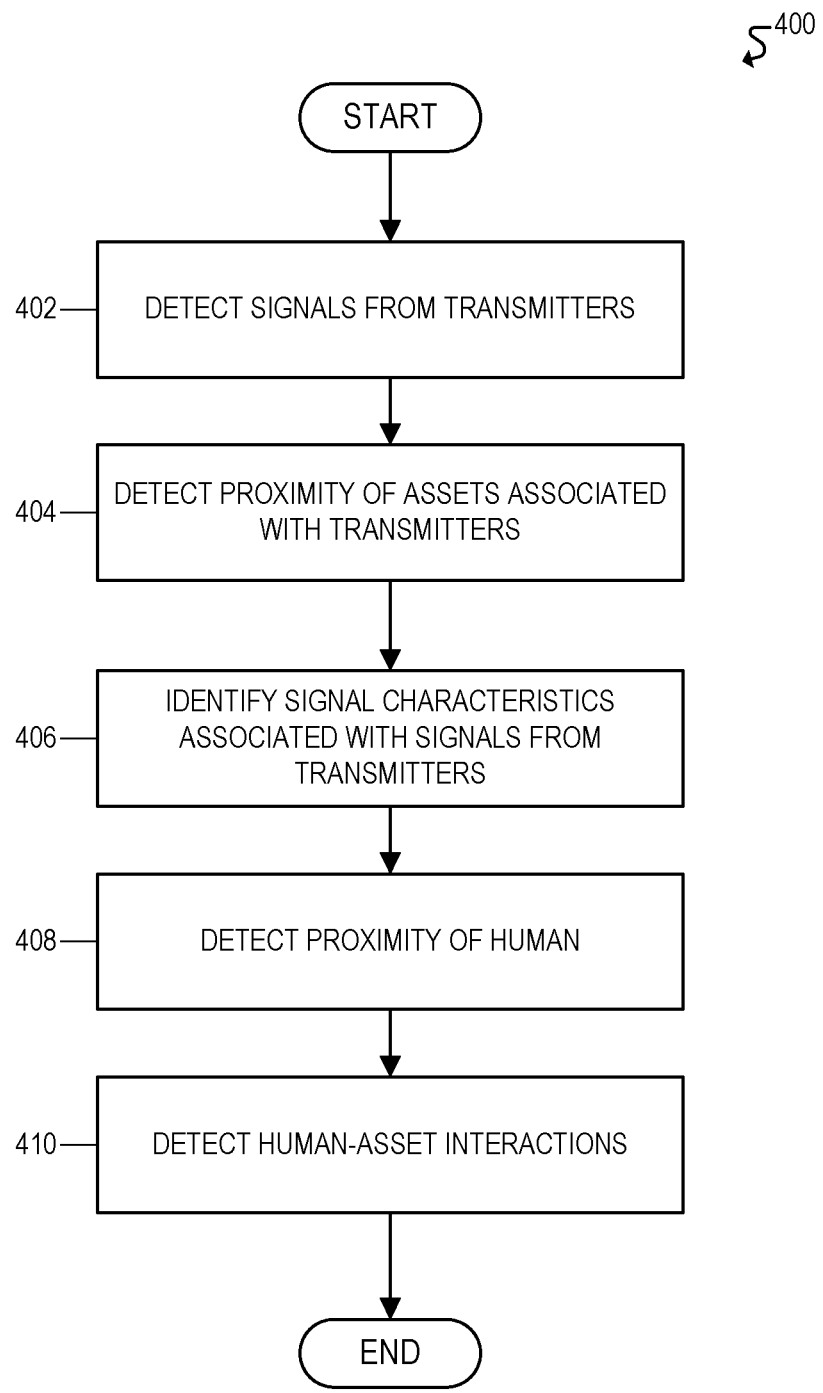
FIG. 4 illustrates a flowchart for an example embodiment of behavior detection.

FIG. 4 illustrates a flowchart 400 for an example embodiment of behavior detection. In some embodiments, for example, flowchart 400 may be used to detect human behavior and interactions in privacy-sensitive contexts (e.g., retail environments and/or fitting rooms). Flowchart 400 may be implemented, in some embodiments, using the embodiments and functionality described throughout this disclosure.

The flowchart may begin at block 402 by detecting signals from one or more transmitters. In some embodiments, for example, a sensor or antenna may be used to detect radio signals emitted by the transmitters. For example, the sensor may be an RFID reader, and the transmitters may be RFID tags.

The flowchart may then proceed to block 404 to detect the proximity of one or more assets associated with the transmitters. In some embodiments, for example, each transmitter may be associated with a particular asset (e.g., a retail product). Accordingly, the proximity of a particular asset can be detected based on a signal detected from a transmitter associated with the particular asset. Moreover, in some embodiments, the type or identity of the asset may be determined based on the identity of the associated transmitter. In some embodiments, for example, each transmitter (e.g., RFID tag) may emit a unique electronic product code (EPC), which may be used to identify the asset associated with a particular transmitter.

The flowchart may then proceed to block 406 to identify signal characteristics associated with the transmitter signals. In some embodiments, for example, phase, signal strength, frequency, and/or Doppler shift information associated with the signals may be identified.

The flowchart may then proceed to block 408 to detect the proximity of a human based on the signal characteristics. In some embodiments, for example, the proximity of a human may be detected based on a fluctuation in the signal characteristics. A relatively small fluctuation in the signal characteristics, for example, may be indicative of signal interference caused by the presence of a human.

The flowchart may then proceed to block 410 to detect human-asset interactions based on the signal characteristics (e.g., phase, signal strength, frequency, Doppler shift information). In some embodiments, for example, movement from the assets may be detected based on a fluctuation in the signal characteristics. A relatively large fluctuation in the signal characteristics, for example, may indicate that the assets are moving, and thus it may be inferred that a human is interacting with the assets. Moreover, in some embodiments, the signal characteristics may be analyzed to identify the particular asset movements, and the particular asset movements may then be used to infer or identify one or more human-asset interactions. In some embodiments, a machine learning model may be used to identify the human-asset interactions. The machine learning model, for example, may be trained to recognize different human-asset interactions associated with different asset movements.

Moreover, in some embodiments, the proximity of a mobile device associated with the human may be detected, and the identity of the mobile device may be determined and may be used as the identity of the human. For example, the identity of the mobile device may be used as an identifier for the detected human-asset interactions associated with a particular person. In some embodiments, the identity of the mobile device may also be used to obtain additional information associated with the human. For example, the human may be a shopper in a retail store, and the identity of the mobile device associated with the shopper may be used to obtain customer sales information associated with that shopper.

Finally, in some embodiments, a data processing or analytics service may be used to derive analytics and insights using the detected human-asset interactions, and optionally using any additional information obtained based on the mobile device identity. In some embodiments, for example, the detected human-asset interactions, along with any additional information, may be transmitted to the cloud for further processing to derive data analytics.

At this point, the flowchart may be complete. In some embodiments, however, the flowchart may restart and/or certain blocks may be repeated. For example, in some embodiments, the flowchart may restart at block 502 to continue processing additional memory access operations.

Example Computing Architectures

Figure 5:
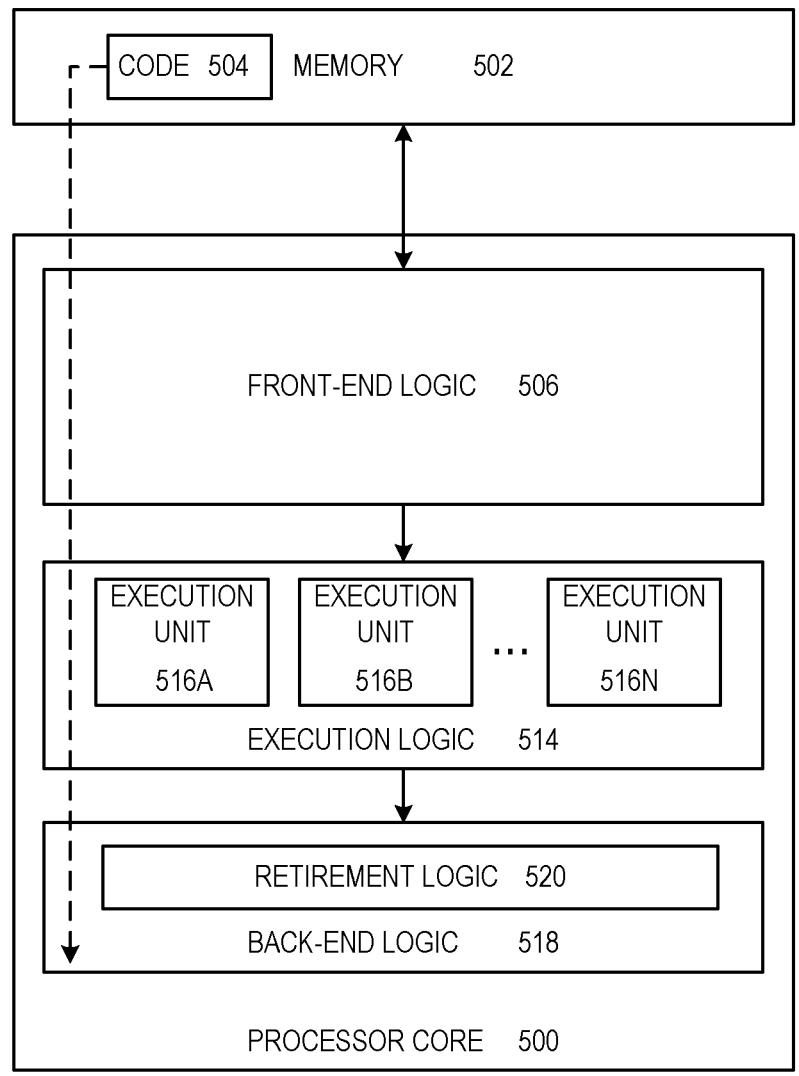
FIGS. 5-6 illustrate example computer architectures that can be used in accordance with embodiments disclosed herein.
Figure 6:
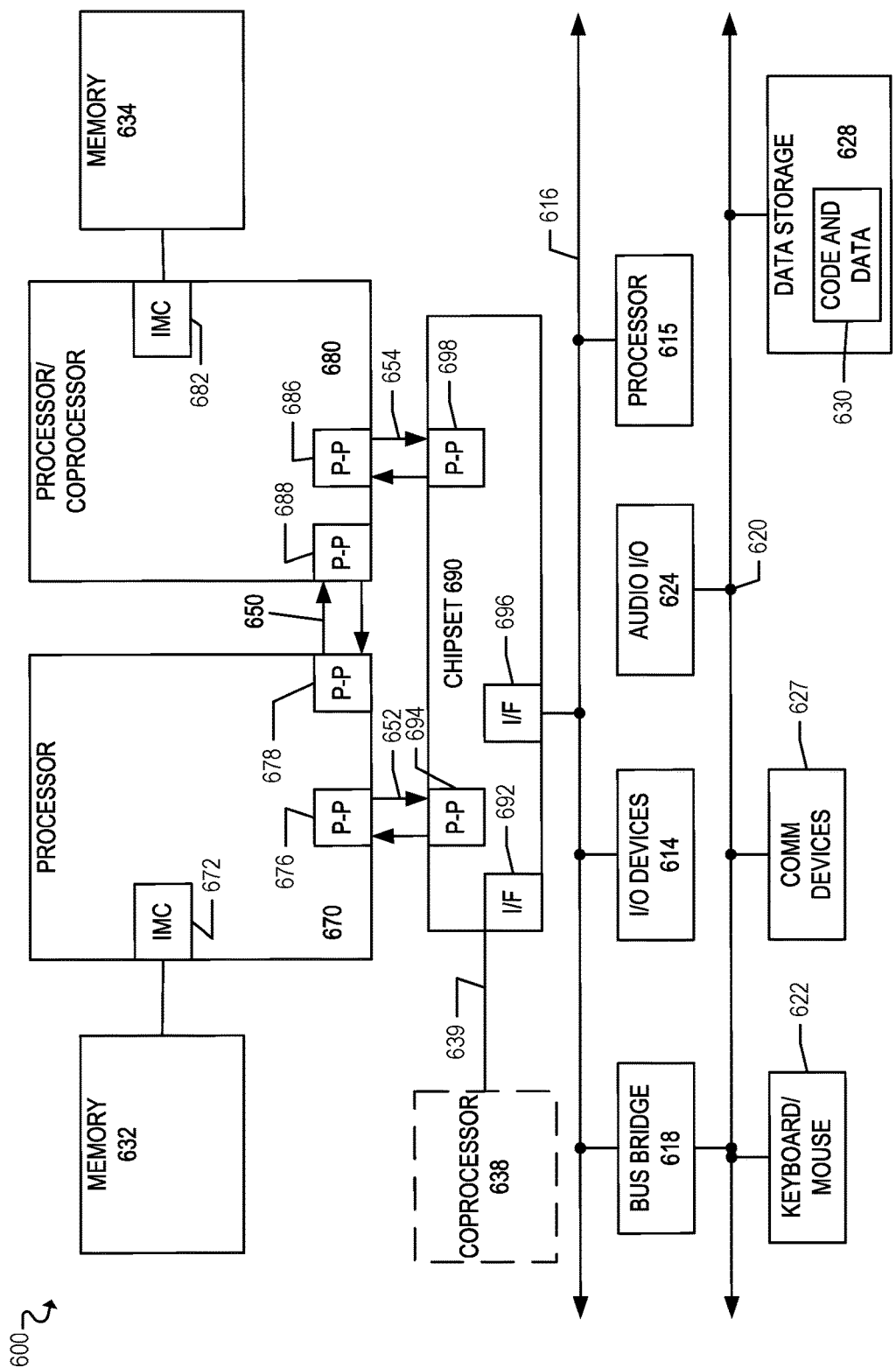

FIGS. 5 and 6 illustrate example computer processor architectures that can be used in accordance with embodiments disclosed herein. For example, in various embodiments, the computer architectures of FIGS. 5 and 6 may be used to implement the behavior detection functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 5 illustrates a block diagram for an example embodiment of a processor 500. Processor 500 is an example of a type of hardware device that can be used in connection with the embodiments described throughout this disclosure. Processor 500 may be any type of processor, such as a microprocessor, an embedded processor, a digital signal processor (DSP), a network processor, a multi-core processor, a single core processor, or other device to execute code. Although only one processor 500 is illustrated in FIG. 5, a processing element may alternatively include more than one of processor 500 illustrated in FIG. 5. Processor 500 may be a single-threaded core or, for at least one embodiment, the processor 500 may be multi-threaded in that it may include more than one hardware thread context (or "logical processor") per core.

FIG. 5 also illustrates a memory 502 coupled to processor 500 in accordance with an embodiment. Memory 502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 500 can execute any type of instructions associated with algorithms, processes, or operations detailed herein. Generally, processor 500 can transform an element or an article (e.g., data) from one state or thing to another state or thing.

Code 504, which may be one or more instructions to be executed by processor 500, may be stored in memory 502, or may be stored in software, hardware, firmware, or any suitable combination thereof, or in any other internal or external component, device, element, or object where appropriate and based on particular needs. In one example, processor 500 can follow a program sequence of instructions indicated by code 504. Each instruction enters a front-end logic 506 and is processed by one or more decoders 508. The decoder may generate, as its output, a micro operation such as a fixed width micro operation in a predefined format, or may generate other instructions, microinstructions, or control signals that reflect the original code instruction. Front-end logic 506 may also include register renaming logic and scheduling logic, which generally allocate resources and queue the operation corresponding to the instruction for execution.

Processor 500 can also include execution logic 514 having a set of execution units 516a, 516b, 516n, etc. Some embodiments may include a number of execution units dedicated to specific functions or sets of functions. Other embodiments may include only one execution unit or one execution unit that can perform a particular function. Execution logic 514 performs the operations specified by code instructions.

After completion of execution of the operations specified by the code instructions, back-end logic 518 can retire the instructions of code 504. In one embodiment, processor 500 allows out of order execution but requires in order retirement of instructions. Retirement logic 520 may take a variety of known forms (e.g., re-order buffers or the like). In this manner, processor 500 is transformed during execution of code 504, at least in terms of the output generated by the decoder, hardware registers and tables utilized by register renaming logic 510, and any registers (not shown) modified by execution logic 514.

Although not shown in FIG. 5, a processing element may include other elements on a chip with processor 500. For example, a processing element may include memory control logic along with processor 500. The processing element may include I/O control logic and/or may include I/O control logic integrated with memory control logic. The processing element may also include one or more caches. In some embodiments, non-volatile memory (such as flash memory or fuses) may also be included on the chip with processor 500.

FIG. 6 illustrates a block diagram for an example embodiment of a multiprocessor 600. As shown in FIG. 6, multiprocessor system 600 is a point-to-point interconnect system, and includes a first processor 670 and a second processor 680 coupled via a point-to-point interconnect 650. In some embodiments, each of processors 670 and 680 may be some version of processor 500 of FIG. 5.

Processors 670 and 680 are shown including integrated memory controller (IMC) units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may optionally exchange information with the coprocessor 638 via a high-performance interface 639. In one embodiment, the coprocessor 638 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of this disclosure is not so limited.

As shown in FIG. 6, various I/O devices 614 may be coupled to first bus 616, along with a bus bridge 618 which couples first bus 616 to a second bus 620. In one embodiment, one or more additional processor(s) 615, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 616. In one embodiment, second bus 620 may be a low pin count (LPC) bus. Various devices may be coupled to a second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to the second bus 620. Note that other architectures are possible. For example, instead of the point-to-point architecture of FIG. 6, a system may implement a multi-drop bus or other such architecture.

All or part of any component of FIG. 6 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 630 illustrated in FIG. 6, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Example Internet-of-Things (IoT) Embodiments

FIGS. 7-10 illustrate examples of Internet-of-Things (IoT) networks and devices that can be used in accordance with embodiments disclosed herein. For example, the operations and functionality described above with reference to FIGS. 1-4 may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 7:
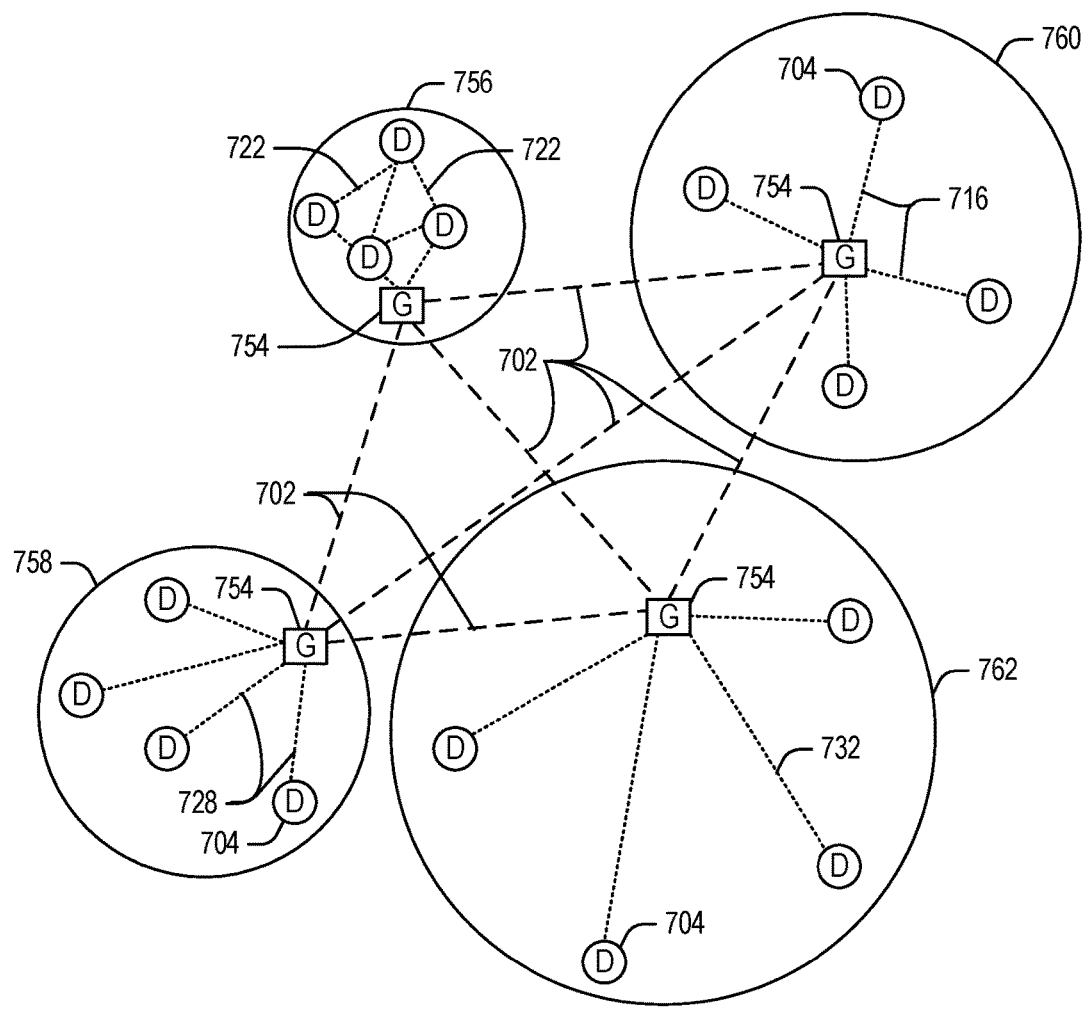
FIGS. 7-10 illustrate examples of Internet-of-Things (IoT) networks and architectures that can be used in accordance with embodiments disclosed herein.

FIG. 7 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 7-10, present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 704, with the IoT networks 756, 758, 760, 762, coupled through backbone links 702 to respective gateways 754. For example, a number of IoT devices 704 may communicate with a gateway 754, and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 704 and gateways 754, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.11 (Wi-Fi®) links 728, a cellular network 760 used to communicate with IoT devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 8 below.

Figure 8:
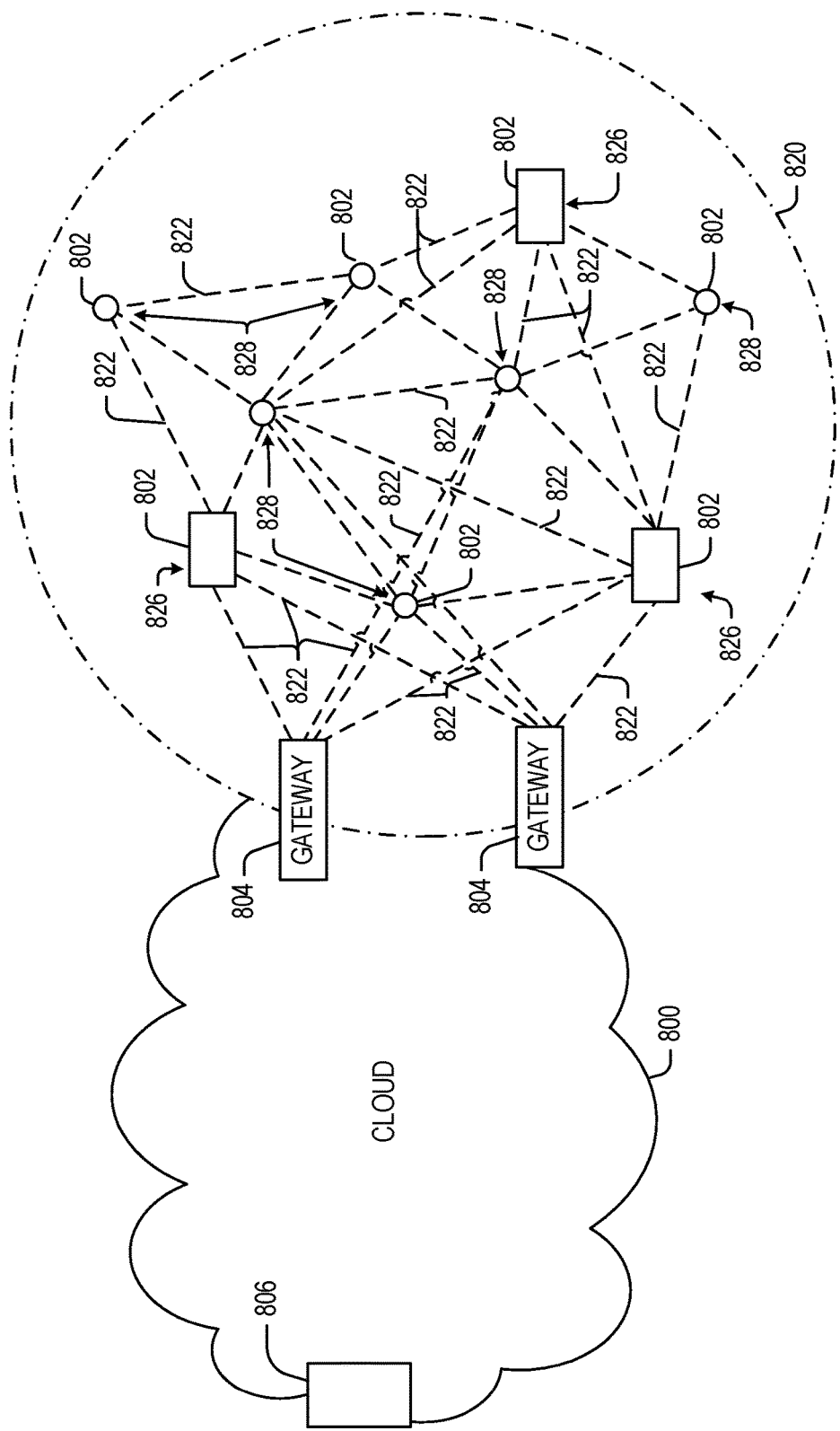

FIG. 8 illustrates a cloud computing network in communication with a mesh network of IoT devices (devices 802) operating as a fog device at the edge of the cloud computing network. The mesh network of IoT devices may be termed a fog 820, operating at the edge of the cloud 800. To simplify the diagram, not every IoT device 802 is labeled.

The fog 820 may be considered to be a massively interconnected network wherein a number of IoT devices 802 are in communications with each other, for example, by radio links 822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 802 are shown in this example, gateways 804, data aggregators 826, and sensors 828, although any combinations of IoT devices 802 and functionality may be used. The gateways 804 may be edge devices that provide communications between the cloud 800 and the fog 820, and may also provide the backend process function for data obtained from sensors 828, such as motion data, flow data, temperature data, and the like. The data aggregators 826 may collect data from any number of the sensors 828, and perform the back end processing function for the analysis. The results, raw data, or both may be passed along to the cloud 800 through the gateways 804. The sensors 828 may be full IoT devices 802, for example, capable of both collecting data and processing the data. In some cases, the sensors 828 may be more limited in functionality, for example, collecting the data and allowing the data aggregators 826 or gateways 804 to process the data.

Communications from any IoT device 802 may be passed along a convenient path (e.g., a most convenient path) between any of the IoT devices 802 to reach the gateways 804. In these networks, the number of interconnections provide substantial redundancy, allowing communications to be maintained, even with the loss of a number of IoT devices 802. Further, the use of a mesh network may allow IoT devices 802 that are very low power or located at a distance from infrastructure to be used, as the range to connect to another IoT device 802 may be much less than the range to connect to the gateways 804.

The fog 820 provided from these IoT devices 802 may be presented to devices in the cloud 800, such as a server 806, as a single device located at the edge of the cloud 800, e.g., a fog device. In this example, the alerts coming from the fog device may be sent without being identified as coming from a specific IoT device 802 within the fog 820. In this fashion, the fog 820 may be considered a distributed platform that provides computing and storage resources to perform processing or data-intensive tasks such as data analytics, data aggregation, and machine-learning, among others.

In some examples, the IoT devices 802 may be configured using an imperative programming style, e.g., with each IoT device 802 having a specific function and communication partners. However, the IoT devices 802 forming the fog device may be configured in a declarative programming style, allowing the IoT devices 802 to reconfigure their operations and communications, such as to determine needed resources in response to conditions, queries, and device failures. As an example, a query from a user located at a server 806 about the operations of a subset of equipment monitored by the IoT devices 802 may result in the fog 820 device selecting the IoT devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, IoT devices 802 in the fog 820 may select the sensors 828 used based on the query, such as adding data from flow sensors or temperature sensors. Further, if some of the IoT devices 802 are not operational, other IoT devices 802 in the fog 820 device may provide analogous data, if available.

Figure 9:
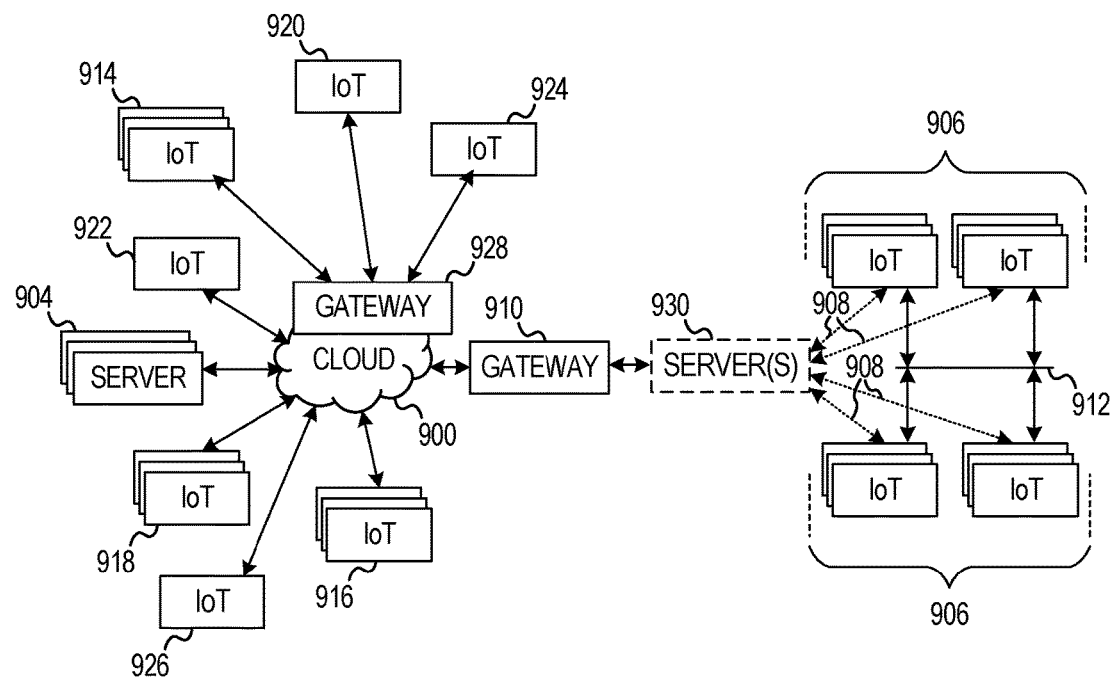

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 8), or a combination therein. The groups of IoT devices may be deployed in various residential, commercial, and industrial settings (including in both private or public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 8).

Figure 10:
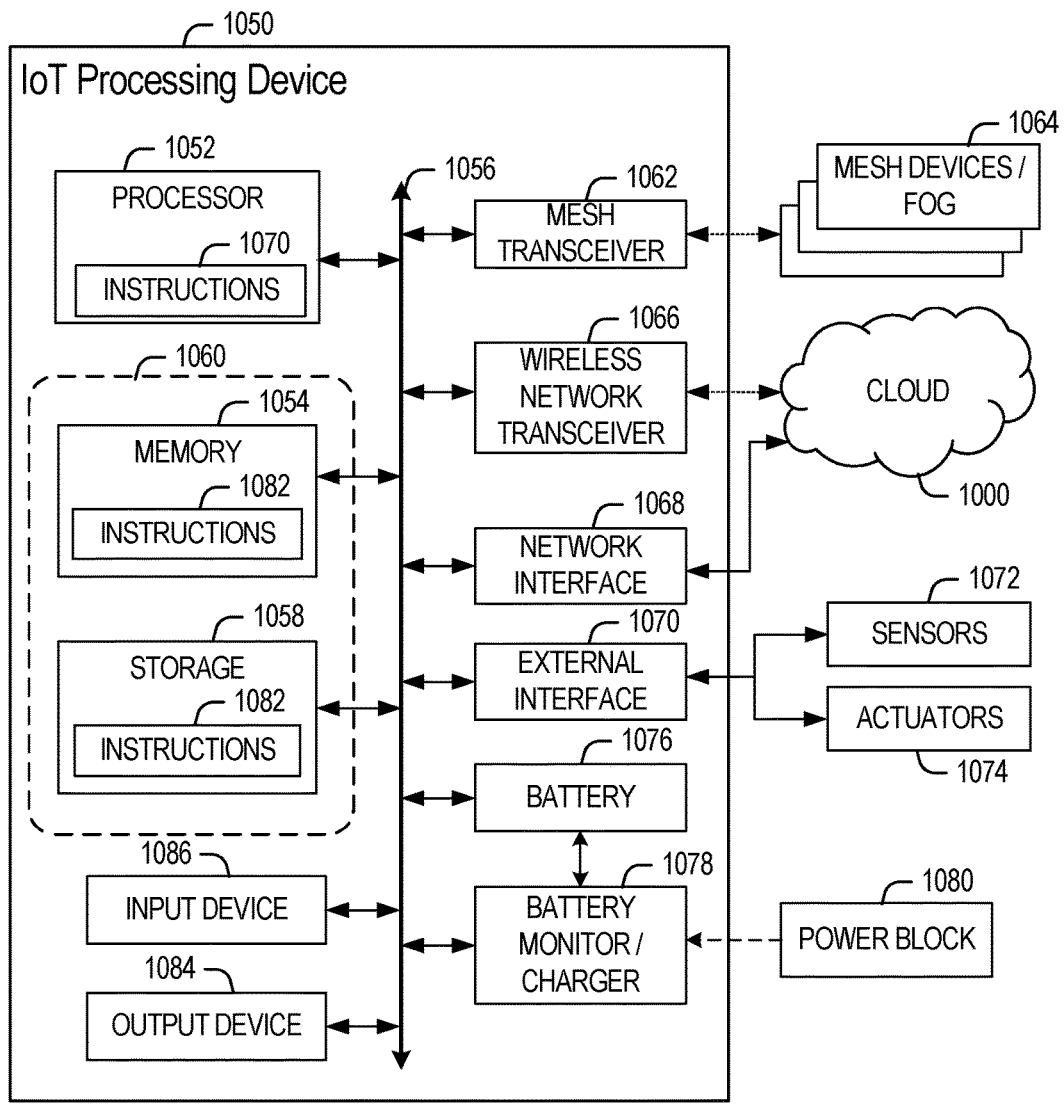

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix, Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may include storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a sensor to detect a plurality of radio signals from one or more transmitters; and a processor to: identify the plurality of radio signals detected by the sensor; detect a proximity of one or more assets based on the plurality of radio signals, wherein the one or more assets are associated with the one or more transmitters; identify the one or more assets based on an identity of the one or more transmitters, wherein each transmitter is associated with a particular asset; identify a plurality of signal characteristics associated with the plurality of radio signals; detect a proximity of a human based on the plurality of signal characteristics; and detect one or more human-asset interactions based on the plurality of signal characteristics.

In one example embodiment of an apparatus, the sensor comprises an RFID reader, and the one or more transmitters comprise one or more RFID tags.

In one example embodiment of an apparatus, the plurality of signal characteristics comprises: signal phase information; signal strength information; or signal frequency information.

In one example embodiment of an apparatus, the processor to detect the proximity of the human based on the plurality of signal characteristics is further to: identify a fluctuation in the plurality of signal characteristics; and determine that the fluctuation is indicative of signal interference associated with the proximity of the human.

In one example embodiment of an apparatus, the processor to detect the one or more human-asset interactions based on the plurality of signal characteristics is further to: identify a fluctuation in the plurality of signal characteristics; determine that the fluctuation is indicative of movement from the plurality of assets; and identify the one or more human-asset interactions based on the movement from the plurality of assets.

In one example embodiment of an apparatus, the processor to identify the one or more human-asset interactions based on the movement from the plurality of assets is further to: identify the movement from the plurality of assets based on the plurality of signal characteristics; and identify the one or more human-asset interactions using a machine learning model, wherein the machine learning model is trained to recognize different human-asset interactions associated with a plurality of asset movements.

In one example embodiment of an apparatus, the processor is further to: detect a proximity of a mobile device associated with the human; and determine an identity of the mobile device.

In one example embodiment of an apparatus, the processor is further to identify the human based on the identity of the mobile device.

In one example embodiment of an apparatus, the processor is further to obtain information associated with the human based on the identity of the mobile device.

In one example embodiment of an apparatus, the information associated with the human comprises customer sales information.

One or more embodiments may include at least one machine accessible storage medium having instructions stored thereon, wherein the instructions, when executed on a machine, cause the machine to: identify a plurality of radio signals received by a sensor from one or more transmitters; detect a proximity of one or more assets based on the plurality of radio signals, wherein the one or more assets are associated with the one or more transmitters; identify the one or more assets based on an identity of the one or more transmitters, wherein each transmitter is associated with a particular asset; identify a plurality of signal characteristics associated with the plurality of radio signals; detect a proximity of a human based on the plurality of signal characteristics; and detect one or more human-asset interactions based on the plurality of signal characteristics.

In one example embodiment of a storage medium, the sensor comprises an RFID reader, and wherein the one or more transmitters comprise one or more RFID tags.

In one example embodiment of a storage medium, the plurality of signal characteristics comprises: signal phase information; signal strength information; or signal frequency information.

In one example embodiment of a storage medium, the instructions that cause the machine to detect the proximity of the human based on the plurality of signal characteristics further cause the machine to: identify a fluctuation in the plurality of signal characteristics; and determine that the fluctuation is indicative of signal interference associated with the proximity of the human.

In one example embodiment of a storage medium, the instructions that cause the machine to detect the one or more human-asset interactions based on the plurality of signal characteristics further cause the machine to: identify a fluctuation in the plurality of signal characteristics; determine that the fluctuation is indicative of movement from the plurality of assets; and identify the one or more human-asset interactions based on the movement from the plurality of assets.

In one example embodiment of a storage medium, the instructions that cause the machine to identify the one or more human-asset interactions based on the movement from the plurality of assets further cause the machine to: identify the movement from the plurality of assets based on the plurality of signal characteristics; and identify the one or more human-asset interactions using a machine learning model, wherein the machine learning model is trained to recognize different human-asset interactions associated with a plurality of asset movements.

In one example embodiment of a storage medium, the instructions further cause the machine to: detect a proximity of a mobile device associated with the human; and determine an identity of the mobile device.

In one example embodiment of a storage medium, the instructions further cause the machine to: identify the human based on the identity of the mobile device; and obtain information associated with the human based on the identity of the mobile device.

One or more embodiments may include a system, comprising: one or more transmitters to transmit a plurality of radio signals, wherein the one or more transmitters are associated with one or more assets; one or more sensors to detect the plurality of radio signals from the one or more transmitters; and a processor to: identify the plurality of radio signals detected by the one or more sensors; detect a proximity of the one or more assets based on the plurality of radio signals; identify the one or more assets based on an identity of the one or more transmitters, wherein each transmitter is associated with a particular asset; identify a plurality of signal characteristics associated with the plurality of radio signals; detect a proximity of a human based on the plurality of signal characteristics; and detect one or more human-asset interactions based on the plurality of signal characteristics.

In one example embodiment of a system, the one or more transmitters comprise one or more RFID tags, and wherein the one or more sensors comprise one or more RFID readers.

In one example embodiment of a system, the system further comprises: a database to store a representation of the one or more human-asset interactions; and a gateway in communication with the one or more sensors, wherein the gateway is to transmit the representation of the one or more human-asset interactions to a data processing service.

In one example embodiment of a system: the one or more assets comprise one or more retail products; and the one or more human-asset interactions comprise one or more customer-product interactions.

One or more embodiments may include a method, comprising: identifying a plurality of radio signals received by a sensor from one or more transmitters; detecting a proximity of one or more assets based on the plurality of radio signals, wherein the one or more assets are associated with the one or more transmitters; identifying the one or more assets based on an identity of the one or more transmitters, wherein each transmitter is associated with a particular asset; identifying a plurality of signal characteristics associated with the plurality of radio signals; detecting a proximity of a human based on the plurality of signal characteristics; and detecting one or more human-asset interactions based on the plurality of signal characteristics.

In one example embodiment of a method, detecting the one or more human-asset interactions based on the plurality of signal characteristics comprises: identifying a fluctuation in the plurality of signal characteristics; determining that the fluctuation is indicative of movement from the plurality of assets; and identifying the one or more human-asset interactions based on the movement from the plurality of assets.

In one example embodiment of a method, identifying the one or more human-asset interactions based on the movement from the plurality of assets comprises: identifying the movement from the plurality of assets based on the plurality of signal characteristics; and identifying the one or more human-asset interactions using a machine learning model, wherein the machine learning model is trained to recognize different human-asset interactions associated with a plurality of asset movements.

What is claimed is:
1. An apparatus, comprising:
  a sensor to detect a plurality of radio signals from one or more transmitters; and
  a processor to:
    identify the plurality of radio signals detected by the sensor;
    detect a proximity of one or more assets based on the plurality of radio signals, wherein the one or more assets are associated with the one or more transmitters;
    identify the one or more assets based on an identity of the one or more transmitters, wherein each transmitter is associated with a particular asset;
    identify a plurality of signal characteristics associated with the plurality of radio signals;
    detect a proximity of a human based on the plurality of signal characteristics;

detect one or more human-asset interactions based on the plurality of signal characteristics, wherein the one or more human-asset interactions are detected based on a machine learning model, wherein the machine learning model is trained to recognize different human-asset interactions based on the plurality of signal characteristics, and wherein the one or more human-asset interactions comprise a plurality of customer-product interactions between a retail customer and a plurality of clothing items; and determine, based on the plurality of customer-product interactions:
 an order in which the plurality of clothing items are tried on by the retail customer;
 one or more groupings of the plurality of clothing items that are tried on together by the retail customer;
 an amount of time in which each of the plurality of clothing items is tried on by the retail customer; or
 a number of times in which each of the plurality of clothing items is tried on by the retail customer.

2. The apparatus of claim 1, wherein the sensor comprises an RFID reader, and wherein the one or more transmitters comprise one or more RFID tags.

3. The apparatus of claim 1, wherein the plurality of signal characteristics comprises:
 signal phase information;
 signal strength information; or
 signal frequency information.

4. The apparatus of claim 1, wherein the processor to detect the proximity of the human based on the plurality of signal characteristics is further to:
 identify a fluctuation in the plurality of signal characteristics; and
 determine that the fluctuation is indicative of signal interference associated with the proximity of the human.

5. The apparatus of claim 1, wherein the processor to detect the one or more human-asset interactions based on the plurality of signal characteristics is further to:
 identify a fluctuation in the plurality of signal characteristics;
 determine that the fluctuation is indicative of movement from the plurality of assets; and
 identify the one or more human-asset interactions based on the movement from the plurality of assets.

6. The apparatus of claim 1, wherein the processor is further to:
 detect a proximity of a mobile device associated with the human; and
 determine an identity of the mobile device.

7. The apparatus of claim 6, wherein the processor is further to identify the human based on the identity of the mobile device.

8. The apparatus of claim 6, wherein the processor is further to obtain information associated with the human based on the identity of the mobile device.

9. The apparatus of claim 8, wherein the information associated with the human comprises customer sales information.

10. The apparatus of claim 6, wherein:
 the processor is further to:
 identify one or more actual sales associated with the retail customer based on the identity of the mobile device; and
 train the machine learning model to identify one or more correlations between the one or more actual sales and the plurality of customer-product interactions.

11. At least one non-transitory machine accessible storage medium having instructions stored thereon, wherein the instructions, when executed on a machine, cause the machine to:
 identify a plurality of radio signals received by a sensor from one or more transmitters;
 detect a proximity of one or more assets based on the plurality of radio signals, wherein the one or more assets are associated with the one or more transmitters;
 identify the one or more assets based on an identity of the one or more transmitters, wherein each transmitter is associated with a particular asset;
 identify a plurality of signal characteristics associated with the plurality of radio signals;
 detect a proximity of a human based on the plurality of signal characteristics;
 detect one or more human-asset interactions based on the plurality of signal characteristics, wherein the one or more human-asset interactions are detected based on a machine learning model, wherein the machine learning model is trained to recognize different human-asset interactions based on the plurality of signal characteristics, and wherein the one or more human-asset interactions comprise a plurality of customer-product interactions between a retail customer and a plurality of clothing items; and
 determine, based on the plurality of customer-product interactions:
  an order in which the plurality of clothing items are tried on by the retail customer;
  one or more groupings of the plurality of clothing items that are tried on together by the retail customer;
  an amount of time in which each of the plurality of clothing items is tried on by the retail customer; or
  a number of times in which each of the plurality of clothing items is tried on by the retail customer.

12. The storage medium of claim 11, wherein the sensor comprises an RFID reader, and wherein the one or more transmitters comprise one or more RFID tags.

13. The storage medium of claim 11, wherein the plurality of signal characteristics comprises:
 signal phase information;
 signal strength information; or
 signal frequency information.

14. The storage medium of claim 11, wherein the instructions that cause the machine to detect the proximity of the human based on the plurality of signal characteristics further cause the machine to:
 identify a fluctuation in the plurality of signal characteristics; and
 determine that the fluctuation is indicative of signal interference associated with the proximity of the human.

15. The storage medium of claim 11, wherein the instructions that cause the machine to detect the one or more human-asset interactions based on the plurality of signal characteristics further cause the machine to:
 identify a fluctuation in the plurality of signal characteristics;
 determine that the fluctuation is indicative of movement from the plurality of assets; and
 identify the one or more human-asset interactions based on the movement from the plurality of assets.

16. The storage medium of claim 11, wherein the instructions further cause the machine to:
  detect a proximity of a mobile device associated with the human; and
  determine an identity of the mobile device.

17. The storage medium of claim 16, wherein the instructions further cause the machine to:
  identify the human based on the identity of the mobile device; and
  obtain information associated with the human based on the identity of the mobile device.

18. A system, comprising:
  one or more transmitters to transmit a plurality of radio signals, wherein the one or more transmitters are associated with one or more assets;
  one or more sensors to detect the plurality of radio signals from the one or more transmitters; and
  a processor to:
    identify the plurality of radio signals detected by the one or more sensors;
    detect a proximity of the one or more assets based on the plurality of radio signals;
    identify the one or more assets based on an identity of the one or more transmitters, wherein each transmitter is associated with a particular asset;
    identify a plurality of signal characteristics associated with the plurality of radio signals;
    detect a proximity of a human based on the plurality of signal characteristics;
    detect one or more human-asset interactions based on the plurality of signal characteristics, wherein the one or more human-asset interactions are detected based on a machine learning model, wherein the machine learning model is trained to recognize different human-asset interactions based on the plurality of signal characteristics, and wherein the one or more human-asset interactions comprise a plurality of customer-product interactions between a retail customer and a plurality of clothing items; and
    determine, based on the plurality of customer-product interactions:
      an order in which the plurality of clothing items are tried on by the retail customer;
      one or more groupings of the plurality of clothing items that are tried on together by the retail customer;
      an amount of time in which each of the plurality of clothing items is tried on by the retail customer; or
      a number of times in which each of the plurality of clothing items is tried on by the retail customer.

19. The system of claim 18, wherein the one or more transmitters comprise one or more RFID tags, and wherein the one or more sensors comprise one or more RFID readers.

20. The system of claim 18, further comprising:
  a database to store a representation of the one or more human-asset interactions; and
  a gateway in communication with the one or more sensors, wherein the gateway is to transmit the representation of the one or more human-asset interactions to a data processing service.

21. The system of claim 18, wherein:
  the one or more assets comprise one or more retail products; and
  the one or more human-asset interactions comprise one or more customer-product interactions.

22. A method, comprising:
  identifying a plurality of radio signals received by a sensor from one or more transmitters;
  detecting a proximity of one or more assets based on the plurality of radio signals, wherein the one or more assets are associated with the one or more transmitters;
  identifying the one or more assets based on an identity of the one or more transmitters, wherein each transmitter is associated with a particular asset;
  identifying a plurality of signal characteristics associated with the plurality of radio signals;
  detecting a proximity of a human based on the plurality of signal characteristics;
  detecting one or more human-asset interactions based on the plurality of signal characteristics, wherein the one or more human-asset interactions are detected based on a machine learning model, wherein the machine learning model is trained to recognize different human-asset interactions based on the plurality of signal characteristics, and wherein the one or more human-asset interactions comprise a plurality of customer-product interactions between a retail customer and a plurality of clothing items; and
  determining, based on the plurality of customer-product interactions:
    an order in which the plurality of clothing items are tried on by the retail customer;
    one or more groupings of the plurality of clothing items that are tried on together by the retail customer;
    an amount of time in which each of the plurality of clothing items is tried on by the retail customer; or
    a number of times in which each of the plurality of clothing items is tried on by the retail customer.

23. The method of claim 22, wherein detecting the one or more human-asset interactions based on the plurality of signal characteristics comprises:
  identifying a fluctuation in the plurality of signal characteristics;
  determining that the fluctuation is indicative of movement from the plurality of assets; and
  identifying the one or more human-asset interactions based on the movement from the plurality of assets.

* * * * *